United States Patent [19]

Desblache et al.

[11] Patent Number: 4,593,161

[45] Date of Patent: Jun. 3, 1986

[54] METHOD OF INITIALIZING A FILTER IN AN ECHO CANCELLER AND COMMUNICATION SYSTEM USING SAID METHOD

[75] Inventors: André Desblache, Nice; Claude Galand, Cagnes sur Mer; Robert Vermot-Gauchy, Saint Paul, all of France

[73] Assignee: International Business Machines Corp., Armonk, N.Y.

[21] Appl. No.: 623,748

[22] Filed: Jun. 22, 1984

[30] Foreign Application Priority Data

Jun. 30, 1983 [EP] European Pat. Off. ........ 83430023.8

[51] Int. Cl.$^4$ ............................................. H04B 3/20
[52] U.S. Cl. ................................................. 179/170.2
[58] Field of Search .......................... 364/724; 333/18; 179/170.2, 170.6, 170.8

[56] References Cited

U.S. PATENT DOCUMENTS

| | | |
|---|---|---|
| 3,864,632 | 2/1975 | Chang . |
| 3,935,535 | 1/1976 | Motley et al. . |
| 4,027,258 | 5/1977 | Perreault . |
| 4,047,013 | 9/1977 | Milewski ............................ 235/156 |
| 4,089,061 | 5/1978 | Milewski ............................ 364/724 |
| 4,144,417 | 3/1979 | Oshima et al. ................... 179/170.2 |
| 4,430,743 | 2/1984 | Watanabe .............................. 375/13 |

FOREIGN PATENT DOCUMENTS

| | | | |
|---|---|---|---|
| 2008903 | 6/1979 | United Kingdom ............. | 179/170.2 |
| 2029175 | 3/1980 | United Kingdom ............. | 179/170.2 |

OTHER PUBLICATIONS

IBM Technical Disclosure Bulletin, vol. 21, No. 5, Oct. 1978, pp. 1916–1918, Desblache et al, "Centering Transversal Equalizer Tap Coefficients".

Primary Examiner—Gene Z. Rubinson
Assistant Examiner—R. Vaas
Attorney, Agent, or Firm—John B. Frisone

[57] ABSTRACT

A method of initializing a filter in an echo canceller as used in a telephone system that includes hybrid transformers for connecting unidirectional lines to bidirectional lines and vice versa. Said method includes the steps of successively transmitting sequences of real and imaginary components of a signal exhibiting an uniform amplitude (i.e. flat) spectrum; receiving and storing sequences of echoes of each of said sequences of components; calculating the fast Fourier transform of complex sequences obtained from the stored sequences of echoes; rotating the terms of the Fourier transform; calculating the inverse transform of the sequence obtained by rotating said terms; and sorting the terms of the inverse transform to derive therefrom the values of the initial coefficients of said filter in said echo canceller.

8 Claims, 7 Drawing Figures

METHOD OF INITIALIZING A FILTER IN AN ECHO CANCELLER AND COMMUNICATION SYSTEM USING SAID METHOD

DESCRIPTION

1. Technical Field

This invention relates to the field of telephone communications and, more particularly, to the elimination of interferences known as echoes that occur in telephone systems.

2. Background Art

In most cases, a telephone conversation between two persons is transmitted partly over a bidirectional 2-wire line and partly over a couple of unidirectional 2-wire lines. A number of devices called hybrid transformers are provided at the junctions of the 2-wire and 4-wire circuits. However, a disadvantage of the hybrid transformers is that they do not have the ability to perfectly separate the two unidirectional paths from each other and that, as a result, they create echoes which are due to impedance imbalances.

Usually, echoes are suppressed through the use of means designed to analyze the signal on one of the unidirectional paths in order to produce dynamically a replica of the echo, which replica is then subtracted from the unprocessed signal on the other unidirectional path. As a general rule, the greater the distance travelled by the echo, the longer the duration of the signal to be analyzed should be. Self-adaptive digital filters are often used to analyze the signal and produce the replica of the echo. Consequently, the longer the duration of the signal to be analyzed, the longer the delay line or the filter should be. This is a disadvantage from the standpoint of hardware implementation. In addition, since the number of coefficients of the filter is proportional to its length, a large computing power is necessary to perform the filtering operations. For the same reason, a large computing power is also required for determining the initial coefficient values.

In a telephone network wherein switching systems (such as PBXs or CXs) are used, the load characteristics of the hybrid transformers vary from call to call and undergo sudden changes in the course of time. As a result, the filters must, in theory at least, be completely readjusted during each successive call. This operation must be carried out very quickly and its complexity is obviously dependent upon the number of coefficients to be readjusted.

BRIEF DESCRIPTION OF THE INVENTION

It is, therefore, the object of the present invention to provide a method and a device for cancelling echoes on a comparatively long telephone line.

The invention relates, in particular, to a method of initializing a digital adaptive filter in an echo canceller, which method includes the steps of:

sending over a unidirectional path a sequence of samples of a signal exhibiting a uniform-amplitude spectrum;

collecting a sequence of predetermined duration of samples of the echo signal;

determining the fast Fourier transform of the sequence of echo signal samples;

rotating the terms of said transform;

determining the inverse fast Fourier transform of the terms so rotated;

sorting the terms provided by the inverse transform to select those to be used as initial coefficients of the adaptive filter in the echo canceller.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
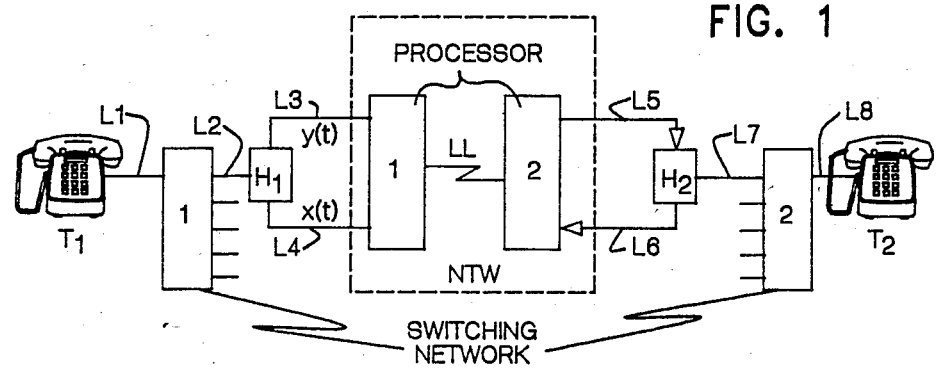
FIG. 1 shows a communication network in which the invention can be used.

FIG. 1 shows an embodiment of a communication network of a mixed type, i.e. that includes both analog and digital portions. For example, the analog portion between two telephone sets T1 and T2 comprises bidirectional 2-wire lines L1, L2, L7, L8, unidirectional 2-wire lines L3, L4, L5, L6, public or private switching networks SW1, SW2, and hybrid transformers H1, H2. The digital portion designated NTW includes two signal processing devices called processors P1, P2, and a digital communication path LL. Processors P1, P2 include analog-to-digital (A/D) converters (not shown), digital-to-analog (D/A) converters (not shown), modulation-demodulation (modem) means (not shown), and network control means (not shown).

Electrical signals travel over L3 and L4 as indicated by the arrows. Thus, signals from T1 and to be forwarded to T2 are routed via L1, SW1, L2, H1 and L3. Conversely, signals from T2 to T1 are routed via L4, H1, L2, SW1 and L1. However, this is true in theory only. In actual practice, a fraction of the signal sent to T1 over L4 will find its way to L3 and consequently travel back to T2. This type of interfering signal is an echo to be eliminated by means of echo cancellers. Such echoes vary according to the impedance of the circuit located to the left of H1 and which represents the load thereof. This load is only defined after the T1-H1 path has been established.

As stated earlier, the network under consideration includes a portion (NTW) within which digital transmissions take place. For this reason, the analog signals involving T1 as well as the service signals and the voice signals travel through device P1. A/D and D/A conversions and modem operations usually are performed therein by means of programmed microprocessors. The modem may be, for example, an IBM3865 Modem using double sideband-quadrature carrier (DSB-QC) modulation techniques, which call for the train of bits supplied by the A/D converter (not shown) for transmission to be divided into groups of bits comprised each of a finite number (K) of bits, each such group being termed at "K-bit" hereinafter. The modem causes a symbol $A_n$ pertaining to a constellation in a space defined by two quadrature carriers to correspond to each K-bit. The wave resulting from the combination of the two modulated carriers travels over communication path LL.

The portion of the communication network that includes P2, H2 and SW2 is identical to the portion that includes SW1, H1 and P1.

Let us now assume that the subscriber (called S1) at telephone set T1 wants to talk to the subscriber (called S2) at telephone set T2. After picking up the handset, subscriber S1 dials a prefix denoting T2's geographical location. This prefix is identified by switching network SW1 which establishes a connection by first selecting processor P1 associated with this particular connection. At this time, those elements which create the echoes associated with H1 are perfectly defined. However, processor P1 must first generate and transmit a signal whose tone informs subscriber S1 that he can dial the number of subscriber S2. S1 does so. The number dialed by S1 is received by processor P1, which then transmits the encoded number to processor P2. Upon completion of this process, P1 becomes available and can be used for the purposes of echo cancellation operations, as will be explained later. As will become apparent, the cancellation of an echo signal includes an initialization phase that can be initiated as soon as the path of the echo has been established, but must be carried out very quickly and be completed before the actual conversation between subscribers S1 and S2 begins.

Upon receiving the dialing bits from P1, P2 decodes same and calls subscriber S2. As soon as S2 picks up his handset, those elements which constitute the echo path involving H2 are defined. The act of picking up T2's handset (off-hook operation) causes a signal to be generated. This signal is detected by processor P2. At this time, and before the actual conversation begins, P2 must initialize an echo canceller, a will later be seen.

The echo paths involving H1 and H2 are comprised of identical elements, so that only one echo canceller and only one initialization procedure will be described hereinafter.

Figure 2:
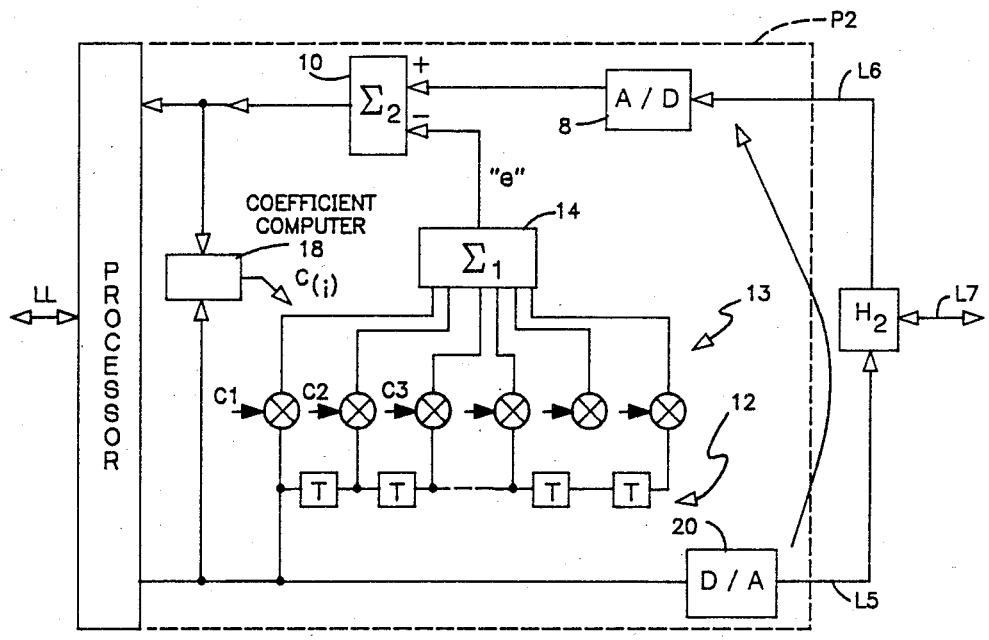
FIG. 2 shows an echo canceller to be initialized in accordance wtih the method of the invention.

Referring now to FIG. 2, there is shown a conventional echo canceller (see, for example, M. Sondhi's article entitled "An Adaptive Echo Canceller", in the Bell System Technical Journal, Vol. 46, No. 3, March 1967, pp. 497-511) whose function can be performed by processor P2. The echo canceller includes a digital filter that generates a replica, "e", of the echo, which replica is then subtracted at 10 from the digital signal obtained at the output of A/D converter 8. The digital filter includes a delay line 12 provided with several taps each of which has a multiplier 13, and an adder 14 supplying signal "e". The multiplication coefficients ($C_{(i)}$) of multipliers 13 are calculated in a device 18 labeled ($C_{(i)}$ COMP) by analyzing the variations of the output signal from subtractor 10. Coefficients $C_{(i)}$ can be calculated by means of the gradient method. The remaining processing of the output signal from subtractor 10 and of the input signal to D/A converter 20, such as the processing operations performed by the modem, is schematically represented by the block labeled PROCESS. These operations, which can be performed by an IBM 3865 Modem, form no part of the invention and shall not be described in greater detail hereinafter.

In principle, the length of delay line 12 should be proportional to the time interval necessary for the echo to travel back in processor P2, that is, to travel from D/A converter 20 to H2 to A/D converter 8. It will subsequently be assumed that this time interval is always less than 16 ms, corresponding to a distance of about 1,600 km between P2 and H2. However, the digital signal processed in converters 8 and 20 is sampled at the rate of 1/T=8 KHz, which is the Nyquist frequency for a signal in the band of frequencies used on telephone circuits.

Accordingly, a 16 ms signal would provide 128 samples. Delay line 12 should therefore have approximately 128 taps, so that 128 coefficients $C_{(i)}$ would have to be initialized and dynamically adjusted during the system operation. The computing power necessary to do so would be prohibitive.

The present method is intended to overcome these difficulties. Upon detecting the off-hook condition of telephone T2 connected to line L8, processor P2 generates and sends over the unidirectional line connected to D/A converter 20 an initialization sequence exhibiting a uniform-amplitude spectrum. Such sequences are described in U.S. Pat. No. 4,089,061 entitled "Method and Device for Determining the Initial Values of the Coefficients of a Complex Transverse Equalizer".

Given the characteristics of the initialization sequence, if the samples are designated as $x_{(n)}$, then the Fourier transform of sequence $\{x_{(n)}\}$ defined by:

$$X_{(k)} = \sum_{n=0}^{N-1} x_{(n)} \cdot e^{\frac{-j2\pi kn}{N}}$$

would give a sequence:

$$\{X_{(k)}\} = A \cdot e^{j\phi k} = \{Re(X_{(K)}) + jIm(X_{(k)})\} \quad (1)$$

where
A = constant
e = base of the Nepierian logarithms,
$(j)^2 = (-1)$,
$\phi_k$ = phase of $X_{(k)}$.
Re ($X_{(k)}$) and Im ($X_{(k)}$) denote the real and imaginary parts of $X_{(k)}$, respectively.

Let $h_{(n)}$ be the impulse response of the path followed by the echo and assume that $h_{(n)} = 0$ for n<0 or n>N−1, with N being a predetermined integer. Let $\{z_{(n)}\}$ be the sequence of echo signal samples obtained at the output of A/D converter 8 as a result of the transmission of $\{x_{(n)}\}$.

We can write:

$$z_{(n)} = x_{(n)} * h_{(n)} \quad (2)$$

where * denotes a convolution operation.
Therefore, $$Z_{(k)} = X_{(k)} \cdot H_{(k)} \quad (3)$$

where $Z_{(k)}$, $X_{(k)}$ and $H_{(k)}$ are respectively the discrete Fourier transforms (DFTs) which, in practice, are calculated in the form of fast Fourier transforms (FFTs) of $z_{(n)}$, $x_{(n)}$ and $h_{(n)}$, respectively.

Hence, $$H_{(k)} = \frac{1}{A} Z_{(k)} \cdot e^{-j\Phi k} \quad (4)$$

$$h_{1(k)} + jh_{2(k)} = \frac{1}{A}[z_{1(k)} + jz_{2(k)}] \cdot [\cos\Phi_k - j\sin\Phi_k] \quad (5)$$

where $z_1$ and $z_2$ represent the components of $Z_{(K)}$, and $h_1$ and $h_2$ those of $H_{(k)}$. Hence, $$h_1(k) = \frac{1}{A}[z_{1(k)} \cdot \cos\Phi_k + z_{2(k)} \cdot \sin\Phi_k] \qquad (6)$$

$$H_2(k) = \frac{1}{A}[z_{2(k)} \cdot \cos\Phi_k - z_{1(k)} \cdot \sin\Phi_k] \qquad (7)$$

Thus, by rotating the components of $Z_{(k)}$ by $-\phi_k$ in the frequency domain, the components of $H_{(k)}$ can be obtained. The desired impulse response in the time domain is then obtained by means of an inverse Fourier transform. The samples $h_{(n)}$ of said impulse response represent the values to be assigned to the coefficients of the filter.

Note that:

$$h_{(n)} = \frac{1}{N} \sum_{k=0}^{N-1} H_{(k)} e^{\frac{j2\pi kn}{N}} \qquad (8)$$

where $$H_{(k)} = h_{1(k)} + jh_{2(k)} \qquad (9)$$

As is known, many sequences of complex values $x_{(n)}$ satisfy the above-mentioned requirement in that these sequences are such that their spectrum of frequencies is practically constant in amplitude (uniform amplitude). Table I below is an example of such a sequence normalized to an amplitude $A = 1024$ (the table should be read from left to right and from top to bottom).

TABLE I

Sequence of Complex Values

Real Components (CR)

| | | | | | | | |
|---|---|---|---|---|---|---|---|
| 1024 | 1024 | 1024 | 1024 | 1024 | 1024 | 1024 | 1024 |
| 0 | −392 | −724 | −946 | −1024 | −946 | −724 | −392 |
| 1024 | 724 | 0 | −724 | −1024 | −724 | 0 | 724 |
| 0 | −946 | −724 | 392 | 1024 | 392 | −724 | −946 |
| 1024 | 0 | −1024 | 0 | 1024 | 0 | −1024 | 0 |
| 0 | −946 | 724 | 392 | −1024 | 392 | 724 | −946 |
| 1024 | −724 | 0 | 724 | −1024 | 724 | 0 | −724 |
| 0 | −392 | 724 | −946 | 1024 | −946 | 724 | −392 |
| 1024 | −1024 | 1024 | −1024 | 1024 | −1024 | 1024 | −1024 |
| 0 | 392 | −724 | 946 | −1024 | 946 | −724 | 392 |
| 1024 | −724 | 0 | 724 | −1024 | 724 | 0 | −724 |
| 0 | 946 | −724 | −392 | 1024 | −392 | −724 | 946 |
| 1024 | 0 | −1024 | 0 | 1024 | 0 | −1024 | 0 |
| 0 | 946 | 724 | −392 | −1024 | −392 | 724 | 946 |
| 1024 | 724 | 0 | −724 | −1024 | −724 | 0 | 724 |
| 0 | 392 | 724 | 946 | 1024 | 946 | 724 | 392 |

Imaginary Components (CI)

| | | | | | | | |
|---|---|---|---|---|---|---|---|
| 0 | 0 | 0 | 0 | 0 | 0 | 0 | 0 |
| 1024 | 946 | 724 | 392 | 0 | −392 | −724 | −946 |
| 0 | 724 | 1024 | 724 | 0 | −724 | −1024 | −724 |
| 1024 | 392 | −724 | −946 | 0 | 946 | 724 | −392 |
| 0 | 1024 | 0 | −1024 | 0 | 1024 | 0 | −1024 |
| 1024 | −392 | −724 | 946 | 0 | −946 | 724 | 392 |
| 0 | 724 | −1024 | 724 | 0 | −724 | 1024 | −724 |
| 1024 | −946 | 724 | −392 | 0 | 392 | −724 | 946 |
| 0 | 0 | 0 | 0 | 0 | 0 | 0 | 0 |
| 1024 | −946 | 724 | −392 | 0 | 392 | −724 | 946 |
| 0 | −724 | 1024 | −724 | 0 | 724 | −1024 | 724 |
| 1024 | −392 | −724 | 946 | 0 | −946 | 724 | 392 |
| 0 | −1024 | 0 | 1024 | 0 | −1024 | 0 | 1024 |
| 1024 | 392 | −724 | −946 | 0 | 946 | 724 | −392 |
| 0 | −724 | −1024 | −724 | 0 | 724 | 1024 | 724 |
| 1024 | 946 | 724 | 392 | 0 | −392 | −724 | −946 |

As soon as the off-hook condition of T2 has been detected, processor P2 transmits to D/A converter 20 and, therefore, to unidirectional "transmit" line L5, the real components (CR) followed by the imaginary components (CI) of the initialization sequence. All of these components have previously been stored in the memory (not shown) of P2. P2 then collects and analyzes the echo signal on unidirectional "receive" line L6. Thus, the samples obtained at the output of A/D converter 8 will be analyzed. As explained hereinafter, several sequences will be repeatedly transmitted in order to enhance reliability.

Figure 3:
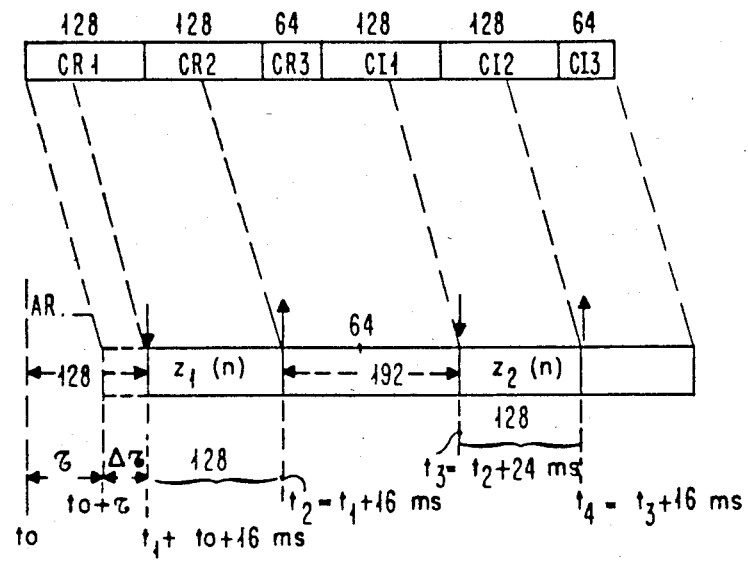
FIG. 3 is a time diagram of the initializing sequences of a filter in the echo canceller.

Referring now to FIG. 3, there is shown a time diagram of the initialization sequences in relation to the transmission (XON) and reception (RON) thereon. At time $t_o$, processor P2 initially transmits a sequence of real components (termed "real sequence") CR1 comprised of 128 samples (see Table I) representing a signal direction of 16 ms. This is followed by a retransmission of the same sequence (now designated CR2), and then by a retransmission of a portion of the initial sequence, which portion is designated CR3 and comprises the first 64 values of the real sequence (CR). This process is repeated with a sequence of imaginary components (termed "imaginary sequence") CI1 comprised of 128 samples, which is retransmitted one and a half times (CI2, CI3). Thus, the duration of the complete initialization sequence will be a multiple of 20 ms, thereby simplifying the implementation of the present invention in a system in which the voice signals are digitally processed in the form of segments of 20 ms.

Figure 4:
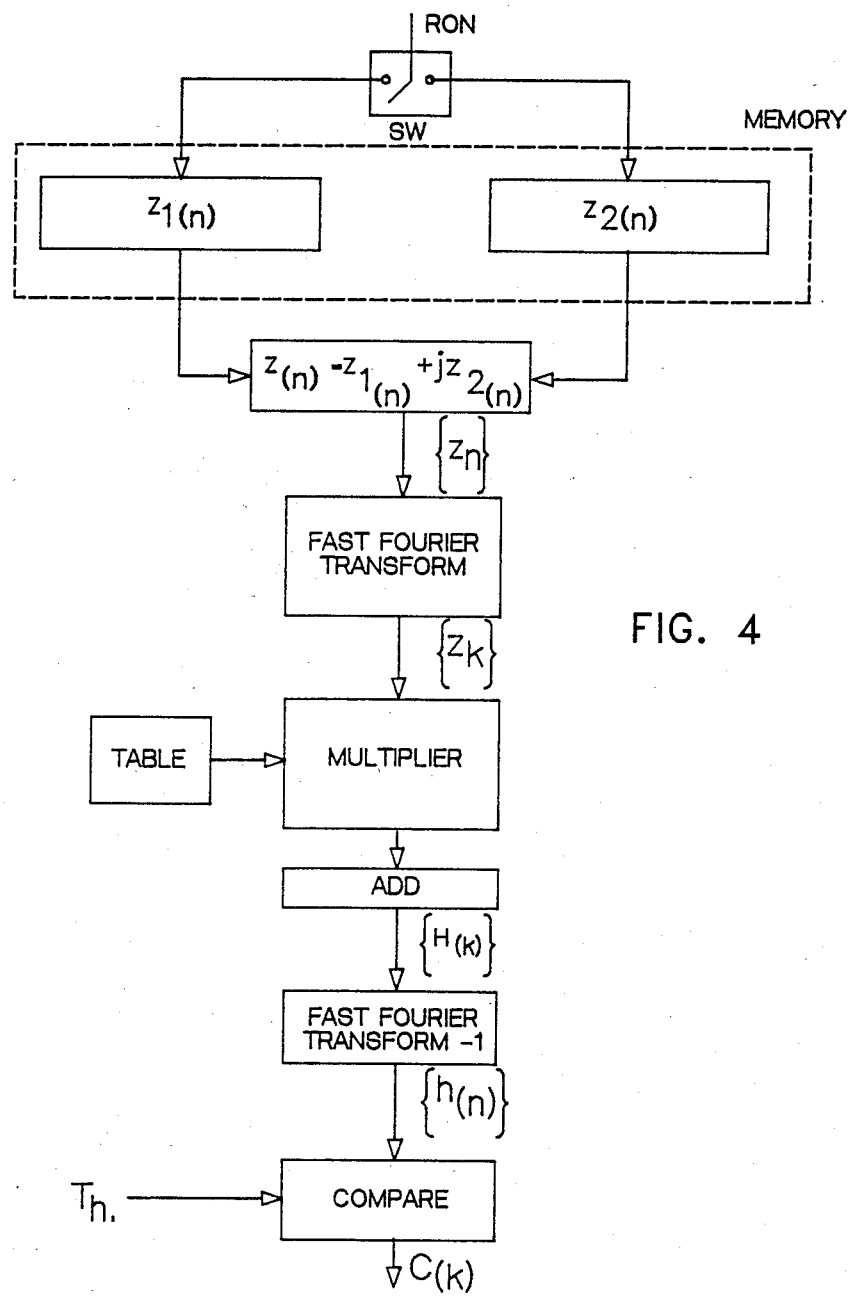
FIG. 4 is a diagram illustrating the method of the invention.

The operations for deriving the initial echo canceler filter coefficients from received initialization sequence is illustrated in FIG. 4.

At the receiving end (RON), processor P2 only begins taking samples of the signal received at the input of A/D converter 8 at time $t_1 = t_o + 16$ ms. Thus, assuming that the echo travels a distance of about 1,600 km, the propagation time $\tau$ of the signal would be $\tau > 16$ ms between the time the initialization sequence leaves processor P2 and the time the echo reaches the input of P2, or more exactly between the input of D/A converter 20 and the output of A/D converter 8. Consequently, the output from A/D converter 8 begins to be read after the block of samples representing sequence CR1 begins to be received. Since this block is repeated, all that is necessary to obtain a block of received real values $z_{1(n)}$ is to retain $N = 128$ consecutive samples. These 128 samples correspond to a block of terms of the real sequence CR subjected to a circular permutation due to the phase shift corresponding to the delay $\Delta\tau$ between the beginning of the actual reception of the echo and the beginning of the detection thereof by processor P2. The 128 samples in sequence $z_{1(n)}$ are stored in a memory MEM (not shown in FIG. 3) by processor P2. P2 thereupon ceases to analyze the echo for 24 ms, and then takes 128 samples corresponding to a sequence $z_{2(n)}$ consisting of the terms of the out-of phase imaginary sequence CI. Because of the interruptions between $z_{1(n)}$ and $z_{2(n)}$, the phase shifts, hence the circular permutations of the terms of equal rank (n) of the real and imaginary sequences, are the same, so that the set of values $z_{1(n)} + jz_{2(n)} = z_{(n)}$ can be formed and used as described above. These values will be used in processor P2 to calculate the initial values of the coefficients of the filter in the echo canceller.

The operations to be performed in processor P2 to determine the initial values of the coefficients $C_{(k)}$ of the filter in the echo canceller are schematically shown. The fast Fourier transform (FFT) of sequence $\{z_{(n)}\}$ is first calculated, which provides the complex terms or vector $Z_{(k)}$ such that:

$$Z_{(k)} = \sum_{n=0}^{N-1} z_{(n)} \cdot e^{\frac{-j2\pi n \cdot k}{N}}$$

Vector $Z_{(k)}$ is then rotated by $-\Phi_k$, with $k=0, 1, \ldots, 127$ designating the rank of the term $Z_k$ in the sequence $\{Z_k\}$ of terms of the FFT. The terms $\Phi_k$ characterize the sequence $x_{(n)}$ and are known (these are the phases defined as):

$$\Phi_k = \arctan\left(\frac{Im(X_{(k)})}{Re(X_{(k)})}\right) \tag{10}$$

The real and imaginary parts of sequence $\{z_{(k)}\}$ are designated $\{z_{1(k)}\}$ and $\{z_{2(k)}\}$, respectively. Sequences $\{z_{1(k)}\}$ and $\{z_{2(k)}\}$ are multiplied by $\sin \phi_k$ and $\cos \phi_k$ in a multiplier (MULT). The terms $\sin \phi_k$ and $\cos \phi_k$ have previously been stored in a sine and cosine table (see TABLE II below).

TABLE II

| Sin$\phi_k$ normalized to 1024 | | | | | | | |
|---|---|---|---|---|---|---|---|
| 724 | 759 | 851 | 964 | 1024 | 926 | 569 | −50 |
| 724 | 345 | −200 | −759 | −1024 | −688 | 200 | 964 |
| 724 | 1023 | 569 | −438 | −1024 | −345 | 851 | 688 |
| 724 | −438 | −1004 | 50 | 1024 | −50 | −1004 | 438 |
| 724 | 688 | −851 | −345 | 1024 | −438 | −569 | 1023 |
| 724 | −964 | 200 | 688 | −1024 | 759 | −200 | −345 |
| 724 | −50 | −569 | 926 | −1024 | 964 | −851 | 759 |
| 724 | −926 | 1004 | −1023 | 1024 | −1023 | 1004 | −926 |
| 724 | −759 | 851 | −964 | 1024 | −926 | 569 | 50 |
| 724 | −345 | −200 | 759 | −1024 | 688 | 200 | −964 |
| 724 | −1023 | 569 | 438 | −1024 | 345 | 851 | −688 |
| 724 | 438 | −1004 | −50 | 1024 | 50 | −1004 | −438 |
| 724 | −688 | −851 | 345 | 1024 | 438 | −569 | −1023 |
| 724 | 964 | 200 | −688 | −1024 | −759 | −200 | 345 |
| 724 | 50 | −569 | −926 | −1024 | −964 | −851 | −759 |
| 724 | 926 | 1004 | 1023 | 1024 | 1023 | 1004 | 926 |
| Cos$\phi_k$ normalized to 1024 | | | | | | | |
| 724 | 688 | 569 | 345 | 0 | −438 | −851 | −1023 |
| −724 | −964 | −1004 | −688 | 0 | 759 | 1004 | 345 |
| 724 | −50 | −851 | −926 | 0 | 964 | 569 | −759 |
| −724 | −926 | 200 | 1023 | 0 | −1023 | 200 | 926 |
| 724 | −759 | −569 | 964 | 0 | −926 | 851 | −50 |
| −724 | −345 | 1004 | −759 | 0 | 688 | −1004 | 964 |
| 724 | −1023 | 851 | −438 | 0 | 345 | −569 | 688 |
| −724 | 438 | −200 | 50 | 0 | 50 | −200 | 438 |
| 724 | −688 | 569 | −345 | 0 | 438 | −851 | 1023 |
| −724 | 964 | −1004 | 688 | 0 | −759 | 1004 | −345 |
| 724 | 50 | −851 | 926 | 0 | −964 | 569 | 759 |
| −724 | 926 | 200 | −1023 | 0 | 1023 | 200 | −926 |
| 724 | 759 | −569 | −964 | 0 | 926 | 851 | 50 |
| −724 | 345 | 1004 | 759 | 0 | −688 | −1004 | −964 |
| 724 | 1023 | 851 | 438 | 0 | −345 | −569 | −688 |
| −724 | −438 | −200 | −50 | 0 | −50 | −200 | −438 |

The terms $z_{1(k)} \cos \Phi_k$, $z_{1(k)} \sin \Phi_k$, $z_{2(k)} \cos \Phi_k$ and $z_{2(k)} \sin \Phi_k$ are obtained at the output of the multiplier, then added in an adder (ADD), and multiplied by a prerecorded gain value equal to $1/A$ (with $A=1024$, for example) to form:

$$\text{and} \begin{cases} h_{1(k)} = \left[\dfrac{1}{A} z_{1(k)}\cos\Phi_k + z_{2(k)}\sin\Phi_k\right] & (11) \\ h_{2(k)} = \left[\dfrac{1}{A} z_{2(k)}\cos\Phi_k - z_{1(k)}\sin\Phi_k\right] & (12) \end{cases}$$

The terms $h_{1(k)}$ and $h_{2(k)}$ represent the real and imaginary components, respectively, of the complex sequence $\{H_{(k)}\}$. The inverse FFT (FFT$^{-1}$) of sequence $\{H_{(k)}\}$ yields the impulse response $\{h_{(n)}\}$ of the path followed by the echo $$h_{(n)} = \frac{1}{N} \sum_{k=0}^{N-1} H_{(k)} \cdot e^{\frac{j2\pi k \cdot n}{N}} \tag{13}$$

In fact, it can be shown that delay $\Delta\tau$ results in function $Z_{(k)}$ being rotated by $\Delta\Phi$.

The effect of this rotation by $\Delta\Phi$, combined with the other rotations performed in multiplier MULT, is merely to cause function $h_{(n)}$ to be delayed. However, the shape of function $h_{(n)}$ is not appreciably modified. As explained hereafter, it is possible, for the purposes of the present invention, to ignore delay $\Delta\tau$ and to solely consider the rank "k" in the sequence of terms of the FFT.

Figure 5:
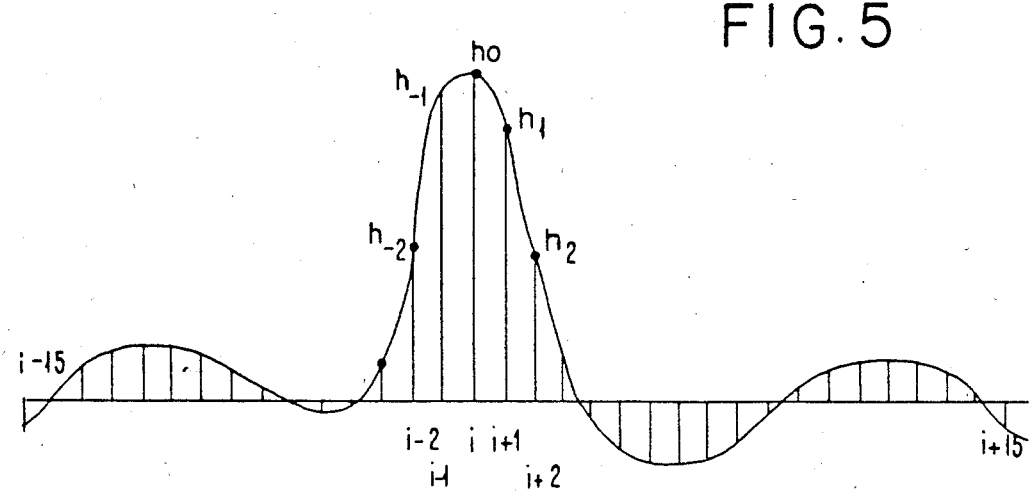

The samples $h_{(n)}$ are then compared with one another in a comparator (COMPARE) to locate and measure the sample of maximum amplitude and, therefore, the center $h_o$ of the impulse response of the echo path. A given number (say, 31) of samples $h_{(n)}$ surrounding $h_o$ is then taken. These terms $h_o$, $h_1$, $h_2$, $h_{-1}$, $h_{-2}$, etc., are the initial values of the coefficients $C_{(i)}$ of the filter of the echo canceller. This makes it possible not only to locate properly and apply the correct central coefficient $C_{(O)}$ of the filter onto delay line 12, as shall be seen, but also to limit the remaining coefficients $C_{(i)}$ to a predetermined number. The impulse response of the echo path is schematically shown in FIG. 5.

Figure 6:
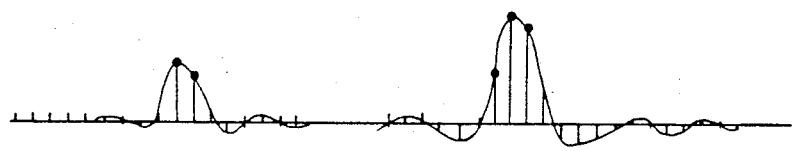
FIGS. 5 and 6 are diagrams showing impulse responses of the echo path.

It should be noted that the method of the invention is particularly suited for use with multiple-echo systems of the type schematically shown in FIG. 6. In such cases, if it is desired to use a filter that always has around thirty coefficients, only the thirty terms $h_{(n)}$ that have the higher absolute values should be taken into account.

In all cases, it is desirable to limit the total number of coefficients. To this end, one may empirically set a single threshold value and only retain those coefficients whose absolute value exceeds the threshold.

Figure 7:
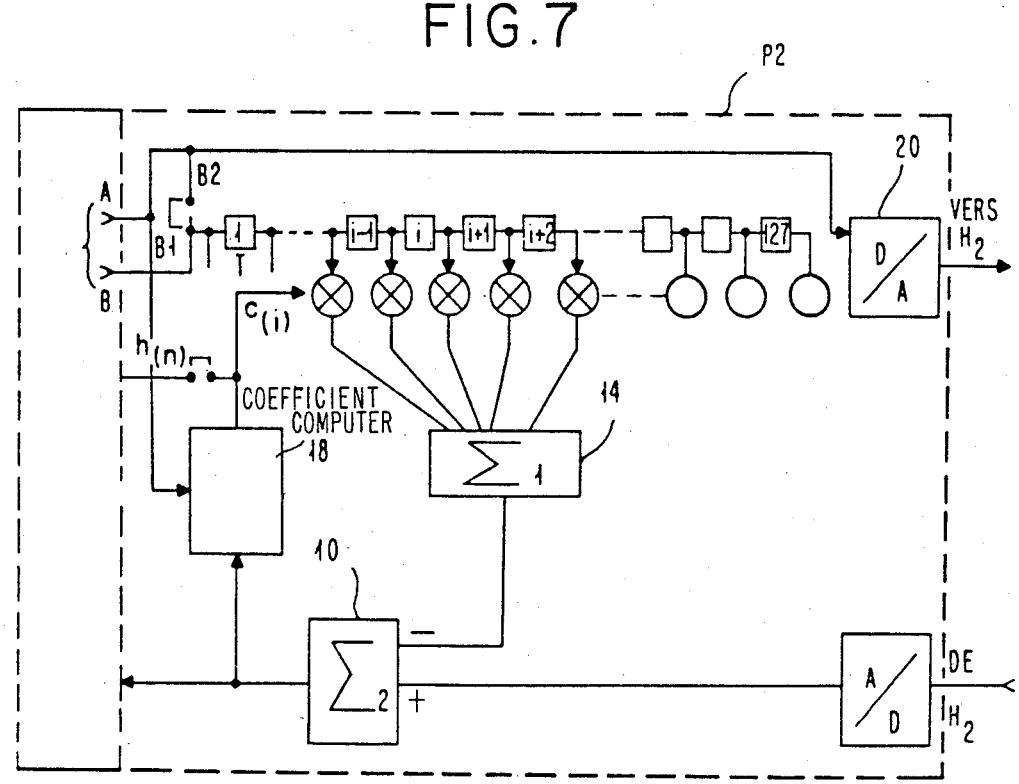
FIG. 7 shows in greater detail the device of FIG. 2.

Referring now to FIG. 7, there is shown a filter that is initialized by means of the method of the invention. Note that the delay line of this filter is provided with 128 taps. Only 31 of these, to which coefficients are to be assigned, will be used. Upon initializing the filter, these coefficients are set to zero, and the sequence schematically shown in FIG. 3 (XON) is directly transmitted via terminal A (FIG. 7) to the input of D/A converter 20 at time $t_o$ when the off-hook condition of telephone set T2 is detected by processor P2. Sixteen milliseconds later, the PROCESS portion of P2 receives the output signal from adder $\Sigma 2$ and takes 128 samples which make up sequence $\{z_{1(n)}\}$ and are stored in memory MEM (not shown). After an interruption of 24 ms, P2 takes 128 samples of $\{z_{2(n)}\}$ during the next 16 ms. Processor P2 then performs the mathematical operations leading to the determination of the sequence of terms $\{h_{(n)}\}$. Then P2 determines the rank and amplitude of the particular one of the 128 values of $h_{(n)}$ terms, that has the highest absolute value. This term will be called $h_o$. Its rank defines the location of the delay line tap to which the multiplication coefficient having the initial value $h_o$ is assigned. This tap is termed central tap, and the other initial coefficients can be assigned on both sides thereof. The means used for setting the tap coefficients to the calculated initial values $h_{(n)}$ is shown in the figure as a link $h_{(n)}$ between the PROCESS portion of P2 and the filter. This link is connected to an output labeled INIT. Obviously, the foregoing implies a simple type of echo (see FIG. 5) Those skilled in the art will readily be able to make the slight changes required to adapt the present method to the cancellation of multiple echoes (see FIG. 6).

Once the filter has been initialized, the transmission of speech can begin, using input B of the delay line and interconnecting points B1 and B2. The system then goes to the dynamic mode in which the coefficients of the echo canceller are adjusted by means of the gradient method by device 18, in a conventional way.

While the invention has been shown and described with reference to a preferred embodiment thereof, it will be understood by those skilled in the art that numerous changes in form and detail may be made therein without departing from the spirit and scope of the invention. In particular, the length of the constant-amplitude complex sequence can be made to correspond to the distance travelled by the echo, which can exceed 16 ms in duration. Also, initialization sequences comprising real terms, such as those described in U.S. Pat. No. 4,047,013 or even sequences of terms whose amplitude is not necessarily constant, could obviously be used while applying the initialization method of the present invention.

We claim:

1. A method for initializing the coefficients of an echo canceler digital filter made to cancel an echo signal within a telephone network including transmitting and receiving sections within an echo signal path, said method being based on fast Fourier transform (FFT) operations operated over echoes due to the transmission of a uniform amplitude spectrum initializing signal over said echo path, and including:
   generating said initializing signal;
   sampling and digitally encoding said initializing signal to derive a first sequence of digital terms therefrom;
   transmitting said first sequence over the transmitting section of said echo path;
   collecting and storing a second sequence of terms received over said receiving section;
   operating an FFT operation over said second sequence of terms, whereby a third sequence of terms is generated;
   operating a phase rotation operation over said third sequence of terms, whereby a fourth sequence of terms is generated;
   operating an inverse FFT operation over said fourth sequence, whereby a fifth sequence of terms is generated;
   sorting the terms of said fifth sequence to determine the largest term therein;
   selecting and measuring a predetermined number of terms of said fifth sequence which are located on both sides of said largest term within the fifth sequence; and,
   using the information provided by said sorting and selecting and measuring operations to initialize said digital filter coefficient.

2. A method for initializing a digital filter in an echo canceler according to claim 1, wherein said first sequence of digitally encoded terms is a complex sequence.

3. A method for initializing a digital filter in an echo canceler according to claim 2, wherein said step of transmitting comprises the transmission in succession of the real and imaginary components of said complex sequence.

4. A method for initializing a digital filter in an echo canceler according to claim 3, wherein said real and imaginary components are repetitively transmitted in a predetermined order.

5. A method for initializing a digital filter in an echo canceler according to claim 4, wherein said step of collecting said second sequence comprises at least two collecting steps separated by a predetermined time interval.

6. A method for initializing a digital filter with variable coefficients in an echo canceler to cancel an echo due to the feedback over a unidirectional receive line of a signal sent over a unidirectional transmit line toward a bidirectional transmit/receive line in a system wherein sequences of digital values representing the real and imaginary components of samples of an initialization signal have been pre-stored, said method including:
   generating said initializing signal;
   sampling and digitally encoding said initializing signal to derive a first sequence of digital terms therefrom;
   transmitting said first sequence over the unidirectional transmit line;
   collecting and storing a second sequence of terms received over the unidirectional receive line section;
   operating a fast Fourier transform (FFT) operation over said second sequence of terms, whereby a third sequence of terms is generated;
   operating a phase rotation operation over said third sequence of terms, whereby a fourth sequence of terms is generated;
   operating an inverse FFT operation over said fourth sequence, whereby a fifth sequence of terms is generated;
   sorting the terms of said fifth sequence to determine the largest term therein;
   selecting and measuring a predetermined number of terms of said fifth sequence which are located on both sides of said largest term within the fifth sequence; and,
   using the information provided by said sorting and selecting and measuring operations to initialize said digital filter coefficient.

7. A method for initializing a digital filter according to claim 6 wherein the sorted terms of said fifth sequence are selected only if they exceed a predetermined threshold value.

8. A telephone communication network including a device for canceling echoes due to the feedback over a unidirectional 2-wire receive line of a fraction of the signal sent over a unidirectional transmit line toward a bidirectional transmit/receive line connected to a telephone set, with the unidirectional to bidirectional transfer being operated with a hybrid transformer, said echo canceling device including a transversal digital filter with adjustable coefficients and with a delay line having a plurality of tap locations and means for initializing said coefficients, said means including:
   means for detecting the off-hook condition of said telephone set;
   means responsive to the detection of said off-hook condition to send over said unidirectional transmit line sequences of N digital values (with N being a predetermined number) representing the real and imaginary components of a flat spectrum initialization signal;

collection means connected to said unidirectional receive line for collecting and storing two sequences of echo signal samples successively received at predetermined times, said sequences being separated by a predetermined time interval;

means connected to said collection means for calculating the fast Fourier transform (FFT) of a complex sequence obtained by combining the two stored sequences of echo signal samples;

a table containing predetermined values $\sin \phi_{-k}$ and $\cos \phi_{-k}$ for $k = 0, 1, \ldots, N-1$ where $\phi_K$ represents the phase of the signal sent over the unidirectional transmit line;

multiplication means connected to said means for calculating said fast Fourier transform and to said table;

inverse Fourier transform means, for providing terms of an inverse Fourier transform, connected to said multiplication means; and, comparison means connected to said inverse Fourier transform means for sorting the terms of said inverse transform and deriving therefrom tap locations on said delay line and initial values of desired coefficients to be assigned to said derived tap locations.

* * * * *